United States Patent
Bartels et al.

(10) Patent No.: US 11,334,576 B2
(45) Date of Patent: May 17, 2022

(54) GUIDANCE-ATTRIBUTE CONTROLS IN A SEARCH SYSTEM

(71) Applicant: eBay Inc., San Jose, CA (US)

(72) Inventors: Benjamin Bartels, Santa Clara, CA (US); Jonathan Daniel Victorino, Portland, OR (US)

(73) Assignee: EBAY INC., San Jose, CA (US)

( * ) Notice: Subject to any disclaimer, the term of this patent is extended or adjusted under 35 U.S.C. 154(b) by 124 days.

(21) Appl. No.: 16/526,813

(22) Filed: Jul. 30, 2019

(65) Prior Publication Data
US 2021/0034633 A1 Feb. 4, 2021

(51) Int. Cl.
*G06F 17/30* (2006.01)
*G06F 16/2457* (2019.01)
*G06F 9/451* (2018.01)
*G06F 16/248* (2019.01)

(52) U.S. Cl.
CPC ........ *G06F 16/24578* (2019.01); *G06F 9/453* (2018.02); *G06F 16/248* (2019.01)

(58) Field of Classification Search
CPC .... G06F 16/33; G06F 16/24578; G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 8,452,806 B2 * | 5/2013 | Gurnani | ................ | G06F 16/245 707/769 |
| 8,620,891 B1 * | 12/2013 | Thirumalai | ......... | G06F 16/9535 707/705 |
| 9,378,276 B1 * | 6/2016 | Mengle | ................. | G06F 16/345 |
| 9,378,278 B2 * | 6/2016 | Kandekar | ............... | H04L 67/30 |

(Continued)

OTHER PUBLICATIONS

ADIDAS,"Search for Shoe", Retrieved from the Mobile Internet URL: <https://www.adidas.com/us/search?q=Shoe&activity=athletic &searchcolor=blue>, Accessed on Oct. 31, 2019, 3 pages.

*Primary Examiner* — Hung D Le
(74) *Attorney, Agent, or Firm* — Shook, Hardy & Bacon L.L.P.

(57) ABSTRACT

Methods, systems, and computer storage media for processing search queries using relevance-based search refinement are provided. In response to a search query, search result items are displayed on a search interface along with selectable guidance attributes. The guidance attributes are an identified ranked set of characteristics of items based on historical user interactions of users interacting with the search result items provided in response to the search query. Upon selection of a guidance attribute, a guidance-attribute control having embedded selectable values is displayed. A selection of an embedded value is received to cause execution of an embedded-value search operation. A first embedded-value search operation is executed to identify a subset of the items using the selected value. Alternatively, a second (Continued)

embedded-value search operation is executed to provide a dynamically updatable count of search results items that will be provided upon refinement of the search results items using the selected value.

20 Claims, 12 Drawing Sheets
(1 of 12 Drawing Sheet(s) Filed in Color)

(56) References Cited

U.S. PATENT DOCUMENTS

| | | | | |
|---|---|---|---|---|
| 2007/0168217 A1* | 7/2007 | Weas | ................. | G06Q 30/0278 |
| | | | | 705/307 |
| 2012/0323953 A1* | 12/2012 | Ortega | ................. | G06F 16/907 |
| | | | | 707/767 |
| 2015/0310526 A1* | 10/2015 | Warren | ................. | G06F 16/951 |
| | | | | 705/26.62 |

* cited by examiner

GUIDANCE-ATTRIBUTE CONTROLS IN A SEARCH SYSTEM

BACKGROUND

Users often rely on search systems to help find information stored on computer systems. Such search systems include search interfaces that provide options for refining search results. For example, a search system may provide standard search refinement features. Such standard search refinement features may include a predefined set of attribute a derived set of attributes, or simply provide values of the attributes of a plurality of search result items. With the ever-increasing use of search systems for retrieving electronically stored information, improvements in computing operations for search systems can provide more efficient refinement of search queries and other operations in search systems.

SUMMARY

Embodiments of the present invention relate to methods, systems and computer storage media for providing a search system with relevance-based search refinement. By way of background, conventional query refinement operations in search systems may lead to inefficient search system refinement user interfaces ("search refinement interface") because the options provided may not be applicable to the search being performed, thus limiting how effectively a user may further refine or search via the search refinement interface. For example, standard refinement user interface features may be a predefined set of attributes (i.e., a standard set of item characteristics related to search result items), a derived set of attributes (i.e., characteristics of all returned search result items), or simply provide values of the attributes of returned search result items. Moreover, such a user interface may include several inapplicable attributes that may make the interface and search functionality cumbersome. As such, an alternative approach for providing search refinement interfaces to support efficient refinement of items in an item listing database would improve computing operations for ease of performing search refinement. Embodiments of the present disclosure are directed towards improving search systems using relevance-based search refinement. In particular, relevance-based search refinement is provided using a refinement user interface having selectable guidance attributes. At a high level, guidance attributes are characteristics of a plurality of items having corresponding values. For example, guidance attributes are an identified ranked set of characteristics of items based on historical user interactions with the items. Further, relevance-based search refinement are provided using a guidance-attribute control (i.e., a user interface control object) having embedded selectable values of the selected guidance attribute. Upon selecting a guidance attribute, a guidance-attribute control is provided. The guidance-attribute control includes values of the selected guidance attribute such that a user can quickly select at least one of the values for use in refining search results. A selection of an embedded value can be received to cause execution of an embedded-value search operation. A first embedded-value search operation can be executed to identify a subset of the items using the selected value. Alternatively, a second embedded-value search operation can be executed to provide a dynamically updatable count of search results items that will be provided upon refinement of the search results items using the selected value. Accordingly, refinement user interfaces that support efficient refinement of items in an item listing database and improve computing operations for ease of performing search refinement are contemplated with embodiments of the present disclosure, as described herein.

In operation, in response to a search query, search result items are displayed on a search interface along with selectable guidance attributes. The guidance attributes are an identified ranked set of characteristics of items based on historical user interactions of users interacting with the search result items provided in response to the search query. Upon selection of a guidance attribute, a guidance-attribute control having embedded selectable values is displayed. A selection of an embedded value is received to cause execution of an embedded-value search operation.

In further operation, selectable guidance attributes are displayed. The guidance attributes are presented to refine items response to a search query. A selection of a guidance attributed is received from the guidance attributes. Based on receiving the guidance attribute, a guidance-attribute control corresponding to the guidance attribute is displayed. The guidance-attribute control is embedded with selectable values of the guidance attribute. Selecting a value initiates embedded-value search operations. The embedded-value search operations are selectively available in the guidance-attribute control based on the selected guidance attribute.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described in detail below with reference to the attached drawing figures, wherein.

DETAILED DESCRIPTION

Figure 1:
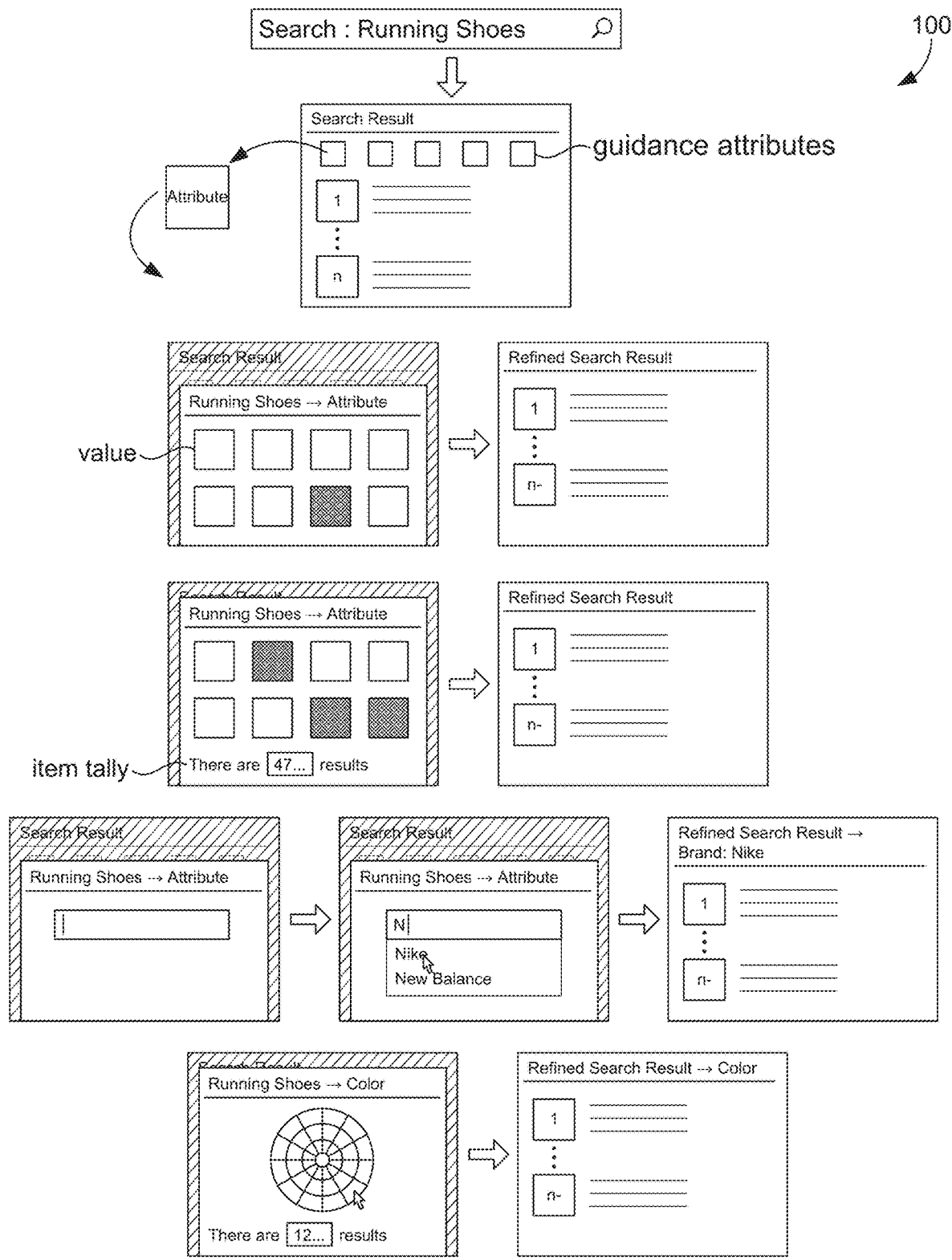
FIG. 1 is a block diagram of an exemplary search system with relevance-based search refinement, in which embodiments described herein may be employed.

Search systems support identifying, for received queries, search result items (e.g., products or content) from item databases. Item databases may specifically be for content platforms or product listing platforms such as EBAY item listing platform, developed by EBAY INC., of San Jose, Calif. Search systems may include search interfaces that provide search refinement functionality that is implemented to systematically browse the World Wide Web, typically for the purpose of refining search results. For example, standard search refinement features may be used in a search system to refine results provided in response to a query.

In conventional search systems, search interfaces may provide standard search system refinement user interface ("search refinement interface") features. In particular, search refinement interface features may be a predefined set of attributes (i.e., a standard set of item characteristics), a derived set of attributes (i.e., characteristics of all returned search result items), or simply values of attributes of returned search result items. For example, a predefined set of attributes (e.g., a color filter with a standard listing of colors, a size filter with a standard listing of sizes) or a derived set of attributes (i.e., entire set of attributes corresponding to a plurality of item provided as search result items) or the values (i.e., an isolated value of an attribute—size 10) may be provided as standard search refinement features. However, such standard search refinement features lead to efficient interfaces because the refinement options provided may not be applicable to the search being performed, thus limiting how effectively a user may further refine or search via the interface.

Moreover, a standard search refinement user interface may include several inapplicable attributes that may make the interface and search functionality cumbersome. For example, a user may have to scroll through several attributes and corresponding attribute values to identify which attributes are relevant to the search being performed and how to further refine existing search results. As such, an alternative approach for providing search refinement interfaces to support efficient refinement of items in an item listing database would improve computing operations for ease of performing search refinement.

Embodiments of the present disclosure are directed to a search system with relevance-based search refinement. Relevance-based search refinement may be provided using a refinement user interface having selectable guidance attributes. At a high level, guidance attributes are characteristics of a plurality of items (e.g., Shoe Size) having corresponding values (e.g., size 11). The selectable guidance attributes are top-ranked characteristics of items (e.g., search result items) based on historical user interactions with the items. The selectable guidance attributes are displayed to provide additional search functionality (e.g., a guidance-attribute control that may perform embedded-value search operations including refining existing search results or executing a new search). For a selected guidance attribute, a guidance-attribute control may be provided. In particular, relevance-based search refinement may further be provided using a guidance-attribute control (i.e., a user interface control object) having embedded selectable values of a guidance attribute. The guidance-attribute control may have values embedded in the control such that the values are directly selectable to initiate an embedded-value search operation. In this way, the selectable guidance attributes may provide a first level of relevance-based search refinement and the guidance-attribute control support further relevance-based search refinement via integrated embedded-value search operation functionality using the selectable values in the control.

Initially, selectable guidance attributes may be provided for relevance-based search refinement. Guidance attributes may be identified based on guidance information. For instance, guidance information may be associated with demand data for a plurality of items (e.g., items in an item listing database). Demand data may generally relate to popularity of item characteristics (e.g., attributes and associated values). Popularity of item characteristics may be based on user interactions with items returned for a search query (e.g., search result items). For example, guidance information may include an identified ranked set of characteristics of items based on historical user interactions with the items from a same/similar search query. As another example, guidance information may include top-ranked characteristics of items (e.g., search result items) based on historical user interactions with the items. Guidance information may be dynamically updated based on user interactions with search result items in relation to the search query. Guidance attributes may be identified using the guidance information in relation to a search query based on historical user interactions with items (provided for a same or similar search query). For example, in response to a search for "Running Shoes," top-ranked characteristics of items may be identified based on historical user interactions with items responsive to a search query "Running Shoes." Such top-ranked characteristics may include guidance attributes. In the "Running Shoes" example, guidance attributes may include, for instance, "Brand Name," "Material Type," and "Color." Such top-ranked characteristics may further include guidance values. In the "Running Shoes" example, guidance values may include, for instance, "Nike," "Leather," and "Red."

One or more selectable guidance attributes may be provided via a refinement user interface for relevance-based search refinement based on the guidance attributes identified in relation to a search query. For example, for search query "Running Shoes," selectable guidance attributes may include, for instance, "Brand Name," "Material Type," and "Color." In some embodiments, the top four ranked guidance attributes may be provided as selectable guidance attributes. In some other embodiments, "Price" may always be presented along with the top ranked guidance attributes. Selecting a guidance attribute may initiate the presentation of a guidance-attribute control having embedded-value search operation functionality.

Relevance-based search refinement may be provided using a guidance-attribute control having embedded selectable values of a guidance attribute. In particular, the guidance-attribute control may include values of a selected guidance attribute such that a user may quickly select at least one of the values for use in refining search results. A user may use the guidance-attribute control to initiate additional embedded-value search operation functionality. In particular, the guidance-attribute control includes values that are directly selectable to initiate an embedded-value search operation. For example, a user may select a guidance attribute (e.g., "Color") to cause display of a guidance-attribute control corresponding to the selected guidance attribute. The guidance-attribute control may include embedded values of the guidance attribute (e.g., "Black," "Red," and "White"). Using the guidance-attribute control, a user may select a value (e.g., "Red") to execute an embedded-value search operation.

In some embodiments, such embedded selectable values may be top-ranked values of items (e.g., search result items) based on historical user interactions with the items. For example, for search query "Running Shoes," when the guidance attribute "Color" is selected, embedded values may include, for instance, "Black," "Red," and "Blue," etc.

In some embodiments, the top twelve ranked values may be provides as selectable values. Selecting one or more value via the guidance-attribute control may initiate an embedded-value search operation.

In embodiments, relevance-based search refinement may be provided based on selectively available embedded-value search operations. The selectively available embedded-value search operations may be based on the selected attribute (e.g., "Color," "Brand," etc.). In particular, upon selecting a guidance attribute, a guidance-attribute control may be provided. The available options for selecting values to execute the embedded-value search operations for use via the guidance-attribute control may be determined based on the selected guidance attribute. In particular, the selected guidance attribute may be analyzed to determine what embedded-value search operations are optimally available. For example, if the guidance attribute "Color" is selected, selectable values may be presented using a color wheel with selectable color values and an auto-complete text-based search box that may be used to identify different color values. As another example, if the guidance attribute "Brand" is selected, selectable values may be presented using selectable ranked values and an auto-complete text-based search box.

Executing an embedded-value search operation may identify a subset of the items using a selected value or provide a dynamically updatable count of items that will be provided upon refinement using the selected value. For example, selecting a value (e.g., "Red") may execute an embedded-value search operation to provide a subset of "Red" items (e.g., red running shoes). As another example, selecting a value (e.g., "Red") may execute an embedded-value search operation to provide a dynamically updatable count of items that are "Red" (e.g., 10 red running shoes). Values may be selected in a variety of manners (e.g., directly selecting a value, using text-based value searching, using color-based value searching). As an example, a value may be directly selected using a pill (i.e. button). As an example of text-based value searching, a value (e.g., "Nike") may selected from a list provided by typing text into a search bar. Text-based value searching may use the search bar limited to auto-complete of available search refinement terms (e.g., guidance attributes and/or values). As "N" is typed into the search bar, a list of "Nike" and "New Balance" may be presented as selectable values. As an example of color-based value searching, a color wheel or color gradient may be provided. For instance, a color wheel may be used to select a specific shade or color (e.g., "Burgundy"). Using a color wheel may more exactly match colors of interest during refinement. In this way, the guidance-attribute control supports relevance-based search refinement while integrating embedded-value search operation functionality using the selectable values in the control.

In operation, items may be displayed on webpage (in response to a search query) along with selectable guidance attributes. The guidance attributes are top-ranked characteristics of items based on historical user interactions with the items provided in response to the search query. Upon selection of a guidance attribute, a guidance-attribute control having embedded selectable values may be displayed. Selection of a value may execute an embedded-value search operation. The embedded-value search operation may either identify a subset of the items using the selected value or provide a dynamically updatable count of items that will be provided upon refinement using the selected value.

Embodiments of the present disclosure have been described with reference to several inventive features associated with a search system with relevance-based search refinement. Inventive features described include identifying and providing selectable guidance attributes for relevance-based search refinement that triggers a guidance-attribute control that supports further relevance-based search refinement via integrated embedded-value search operation functionality using selectable values in the control. Functionality of the embodiments of the present disclosure have further been described, by way of an implementation and anecdotal examples, to demonstrate that the operations for relevance-based search refinement are an unconventional ordered combination of operations that operate with a search operations manager as a solution to a specific problem in search technology environment to improve computing operations in search systems. Overall, these improvements result in less CPU computation, smaller memory requirements, and increased flexibility in search systems.

With reference to FIG. 1, FIG. 1 illustrates an exemplary search system 100 in which implementations of the present disclosure may be employed. In particular, FIG. 1 shows high level functionality of search system 100. The search system 100 may provide relevance-based search refinement. The search system 100 may receive search queries. The search query may indicate an item or item type. For example, as depicted, the search query may be "Running Shoes." In response to receiving a search query, the search system 100 may identify a set of items for the search query in an item database. For the search query, "Running Shoes," a set of running shoes may be identified in the item database. The identified set of items may be presented (e.g., via a user interface).

Guidance attributes may be presented along with the identified set of items. The guidance attributes may be provided for selection to perform relevance-based search refinement. The guidance attributes may be identified using popularity of item characteristics based on user interactions with items returned for a same or similar search query (e.g., search result items). In particular, the guidance attributes may be identified from a ranked set of characteristics of items based on historical user interactions with the items. For example, in response to the search for "Running Shoes," top-ranked characteristics of items (e.g., "Brand Name," "Material Type," and "Color") may be identified based on historical user interactions with items responsive to the search query "Running Shoes."

A guidance attribute may be selected to trigger the presentation of a guidance-attribute control. As depicted, the guidance-attribute control has embedded selectable values of the selected guidance attribute. The guidance-attribute control may provide further relevance-based search refinement based on selected values via the control. Selecting values may result in executing embedded-value search operations.

In one example, a single value may be selected via the guidance-attribute control. This selection may result in an embedded-value search operation to identify a subset of items that have the selected value from the identified set of items (e.g., identify the subset of items 1 to n-from the set of items 1 to n). In another example, multiple values may be selected via the guidance-attribute control. This selection may result in an embedded-value search operation to identify a subset of items that have the selected values from the identified set of items (e.g., the subset of items 1 to n-from the set of items 1 to n).

In an additional example, a dynamically updatable count of items that will be provided via the guidance-attribute control upon refinement using a selected value may be provided. It should be appreciated that such a dynamically updatable count of items may be provided prior to executing the embedded-value search operation to refine the set of items. However, the subset of items may be identified prior to the execution the embedded-value search operation to refine the set of items. Identifying the subset of items in this manner may reduce any lag between execution of the embedded-value search operation to refine the set of items and providing the subset of items.

In another example, a value may be selected via the guidance-attribute control using text-based value searching. In text-based value searching, a value (e.g., "Nike") may be selected from a list provided by typing text into a search bar. Text-based value searching may use the search bar limited to auto-complete of available search refinement terms (e.g., guidance attributes and/or values). For instance, as "N" is typed into the search bar, a list of "Nike" and "New Balance" may be presented as selectable values. Selecting one of the text-based value may result in an embedded-value search operation to identify a subset of items that have the selected value from the identified set of items (e.g., the subset of items 1 to n-from the set of items 1 to n).

As a further example, a value may be selected via the guidance-attribute control using color-based value searching. Color-based value searching may use a color wheel, as depicted, or color gradient. For instance, the color wheel may be used to select a specific shade or color (e.g., "Burgundy"). Using a color wheel may more exactly match colors of interest during refinement. Selecting a color value may result in an embedded-value search operation to identify a subset of items that have the selected value from the identified set of items (e.g., the subset of items 1 to n-from the set of items 1 to n).

Such examples of relevance-based search refinement by selecting values via the guidance-attribute control may be combined in any manner. In this way, the guidance-attribute control supports relevance-based search refinement while integrating embedded-value search operation functionality using selectable values in the control.

Figure 2A:
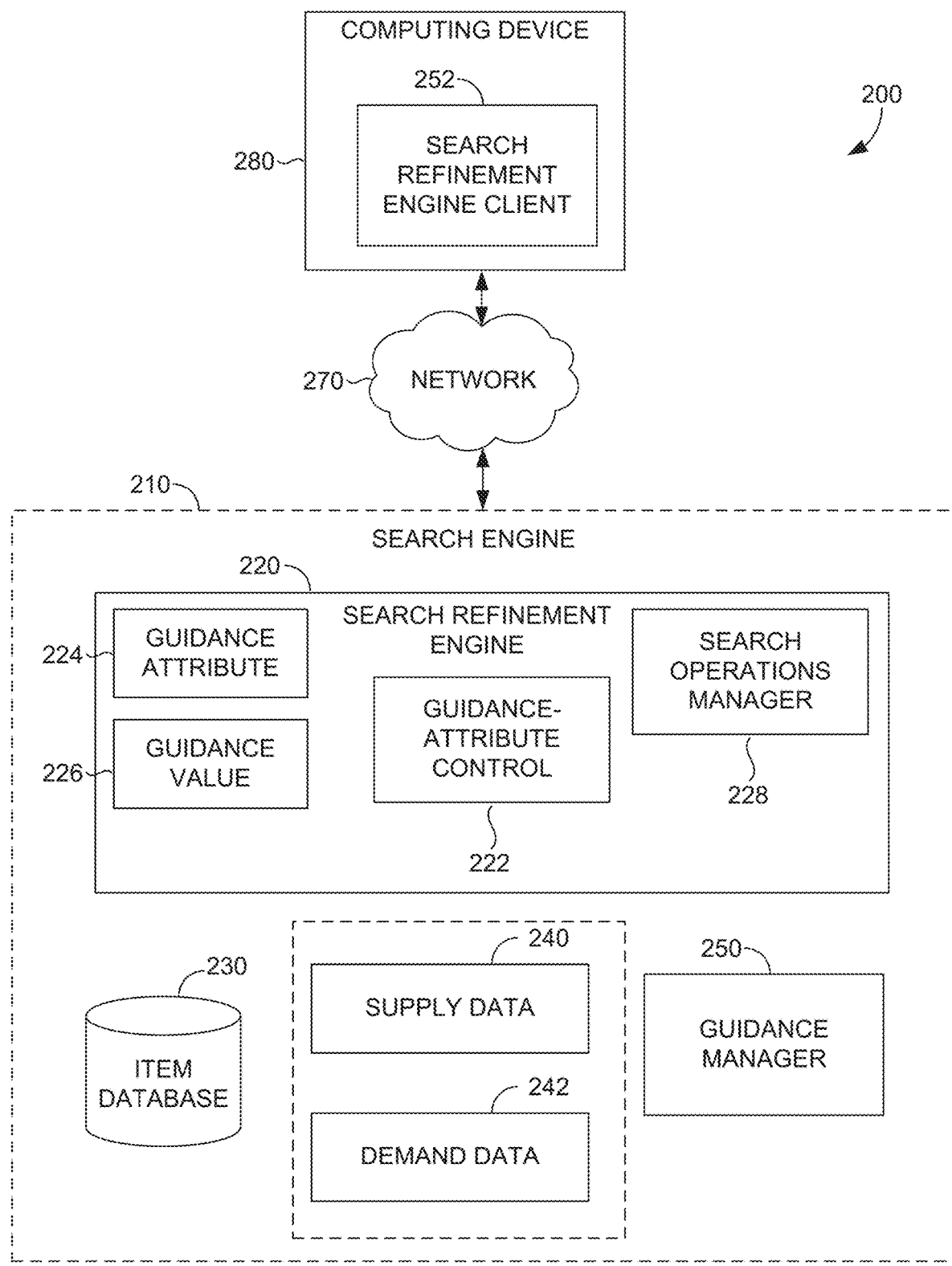
FIGS. 2A-2C are block diagrams of an exemplary search system with relevance-based search refinement, in which embodiments described herein may be employed.

With reference to FIG. 2A, FIG. 2A illustrates an exemplary search system 200 in which implementations of the present disclosure may be employed. In particular, FIG. 2A shows a high level architecture of search system 200 having components in accordance with implementations of the present disclosure. Among other components or engines not shown, search system 200 includes a computing device 280. The computing device 280 communicates via a network 270 and with a search engine 210. The search engine 210 includes search refinement engine 220 having guidance-attribute control 222, guidance attribute 224, guidance value 226, and search operations manager 228, item database 230, supply data 240, demand data 242, guidance manager 250, and search refinement engine client 252. Each of the identified components may represent a plurality of different instances of the component, for example, guidance attribute 224 may be various guidance attributes and guidance value 226 may be various guidance values, as described below. The components of the search system 200 may communicate with each other over one or more networks (e.g., public network or virtual private network "VPN") as shown with network 270. The network 270 may include, without limitation, one or more local area networks (LANs) and/or wide area networks (WANs). The computing device 280 may be a client computing device that corresponds to the computing device described herein with reference to FIG. 7.

The components of the search system 200 may operate together to provide functionality for relevance-based search refinement, as described herein. In particular, the relevance-based search refinement may use a guidance-attribute control having embedded selectable values of a guidance attribute. As discussed, the search system 200 supports processing operation requests (e.g., search queries, search refinement, other search system requests from the computing device 280). For example, query results for a search query from the search system may include identified items as well as additional relevant information, where the additional external information (e.g., guidance attributes and associated values) may be identified by the guidance manager 250 and provided via search refinement engine 220.

The search engine 210 is responsible for supporting operations for providing search refinement as described herein. The search engine 210 in the search system 200 may access items in an item listing platform. The search engine 210 may be part of an item listing platform that supports access to the item database 230. The items in the item database may be stored based on a data structure having a structural arrangement of items (e.g., an item category and an item classification system). For example, the item database 230 may be implemented with a database schema that stores item listings based on item titles. Available items in the item database 230 may be identified using, for example, supply data 240. Supply data 240 may include information related to item database 230. For example, the supply data 240 may include items and associated item information. Associated item information may comprise attributes and associated values for the items. As a non-limiting example, a pair of shoes may have attributes that include "Brand" "Material" and "Color" along with associated values "Nike" "Leather" and "Black," respectively.

The guidance manager 250 manages guidance information that may be used by the search system 200. Guidance information may be associated with demand data for a plurality of items (e.g., items in the item database 230). Demand data may generally relate to popularity of item characteristics (e.g., attributes and associated values). Popularity of item characteristics may be based on user interactions with items returned for a search query (e.g., search result items). For example, guidance information may include an identified ranked set of characteristics of items based on historical user interactions with the items. As another example, guidance information may include top-ranked characteristics of items (e.g., search result items) based on historical user interactions with the items. Guidance information may be dynamically updated based on user interactions with search result items in relation to the search query.

Guidance manager 250 may identify relevant guidance information in relation to a search query based on historical user interactions with items (provided for a same or similar search query). For example, For example, in response to a search for "Running Shoes," the guidance manager 250 may identify a ranked set of characteristics (i.e., top-ranked characteristics) of items based on historical user interactions with items responsive to a search query "Running Shoes." Such ranked characteristics may indicate guidance attributes. In the "Running Shoes" example, guidance attributes may include, for instance, "Brand Name," "Material Type," and "Color." Such ranked characteristics may further include guidance values. In the "Running Shoes" example, ranked values may include, for instance, "Nike," "Leather," and "Red."

The search refinement engine 220 supports relevance-based search refinement by implementing guidance attribute 224 in accordance with the search system 200. Guidance attribute 224 may leverage a ranked set of characteristics (i.e., top-ranked characteristics) of items (e.g., guidance attributes) identified by the guidance manager 250 in relation to a search query. In particular, the guidance attribute 224 supports providing selectable guidance attribute(s). One or more guidance attributes may be presented based on the guidance attributes identified in relation to a search query. For example, for search query "Running Shoes," guidance attributes may include, for instance, "Brand Name," "Material Type," and "Color." In some embodiments, the top four ranked guidance attributes may be provided as selectable guidance attributes. In some other embodiments, "Price" may always be presented along with the top ranked guidance attributes. Selecting a guidance attribute may initiate the presentation of a guidance-attribute control (e.g., guidance-attribute control 222) having embedded-value search operation functionality.

The search refinement engine 220 further supports relevance-based search refinement by implementing the guidance-attribute control 222 in accordance with the search system 200. The guidance-attribute control 222 supports providing embedded selectable values of a guidance attribute that initiate embedded-value search operations. The guidance-attribute control 222 may be presented upon selection of a guidance attribute. In this way, the guidance-attribute control 222 supports providing embedded selectable values of the selected guidance attribute. The embedded selectable values provided via the guidance-attribute control 222 may be provided by guidance value 226. Such embedded selectable values may be top-ranked values of items (e.g., search result items) based on historical user interactions with the items. For example, for search query "Running Shoes," when the guidance attribute "Color" is selected, guidance values may include, for instance, "Black," "Red," and "Blue," etc. In some embodiments, the top twelve ranked guidance values may be provides as selectable guidance values. Selecting one or more guidance value via the guidance-attribute control 222 may initiate an embedded-value search operation.

The search refinement engine client 252 operates with the search refinement engine 220 to provide the functionality as described herein (i.e., relevance-based search refinement). In particular, the search refinement engine client 252 may implement the presentation of a refinement user interface having selectable guidance attributes. Such selectable guidance attributes may be provided using the guidance attribute 224. Receiving a selection of a guidance attribute may trigger a further presentation of a refinement user interface having embedded selectable values of a selected guidance attribute. Such embedded selectable values may be provided using the guidance value 226 in conjunction with the guidance-attribute control 222. Receiving a selection of an embedded selectable value may initiate embedded-value search operations.

Figure 2B:
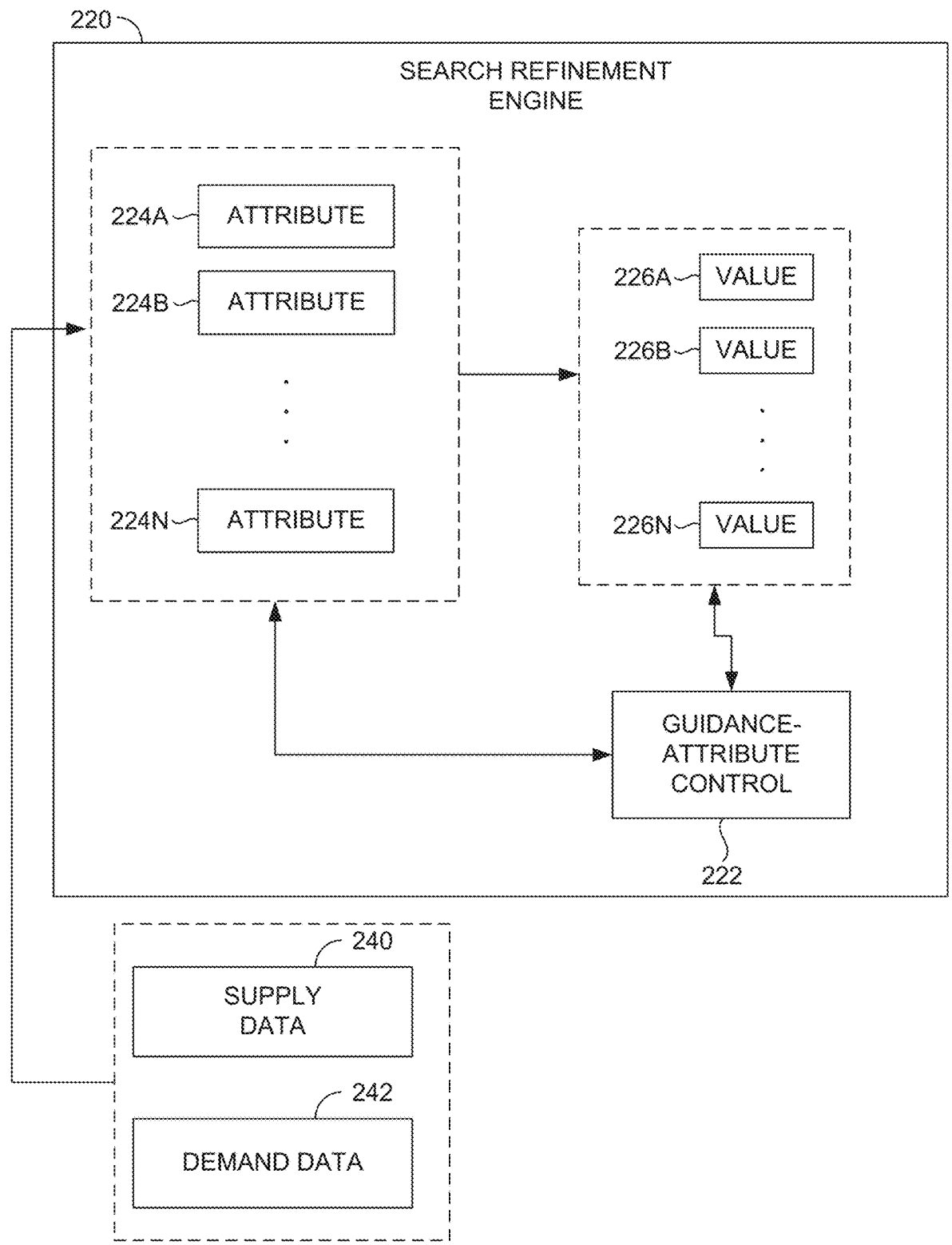

With reference to FIG. 2B, FIG. 2B illustrates search refinement engine 220 with components that support search refinement using embedded-value search operations. The embedded-value search operations may be performed based on a selected value (i.e., value 226A, value 226B, . . . , and value 226N). In particular, one or more values (i.e., value 226A, value 226B, . . . , and value 226N) may be selected via guidance-attribute control 222 to implement an embedded-value search operation. The guidance-attribute control 222 is provided based on a selection of a guidance attribute (i.e., attribute 224A, attribute 224B, . . . , and attribute 224N). The guidance attribute(s) is provided based on supply data 240 (e.g., indicating available items in item database 230) and demand data 242 (indicating popularity of item characteristics based on historical interactions with the characteristics of items provided for same or similar search queries).

Figure 2C:
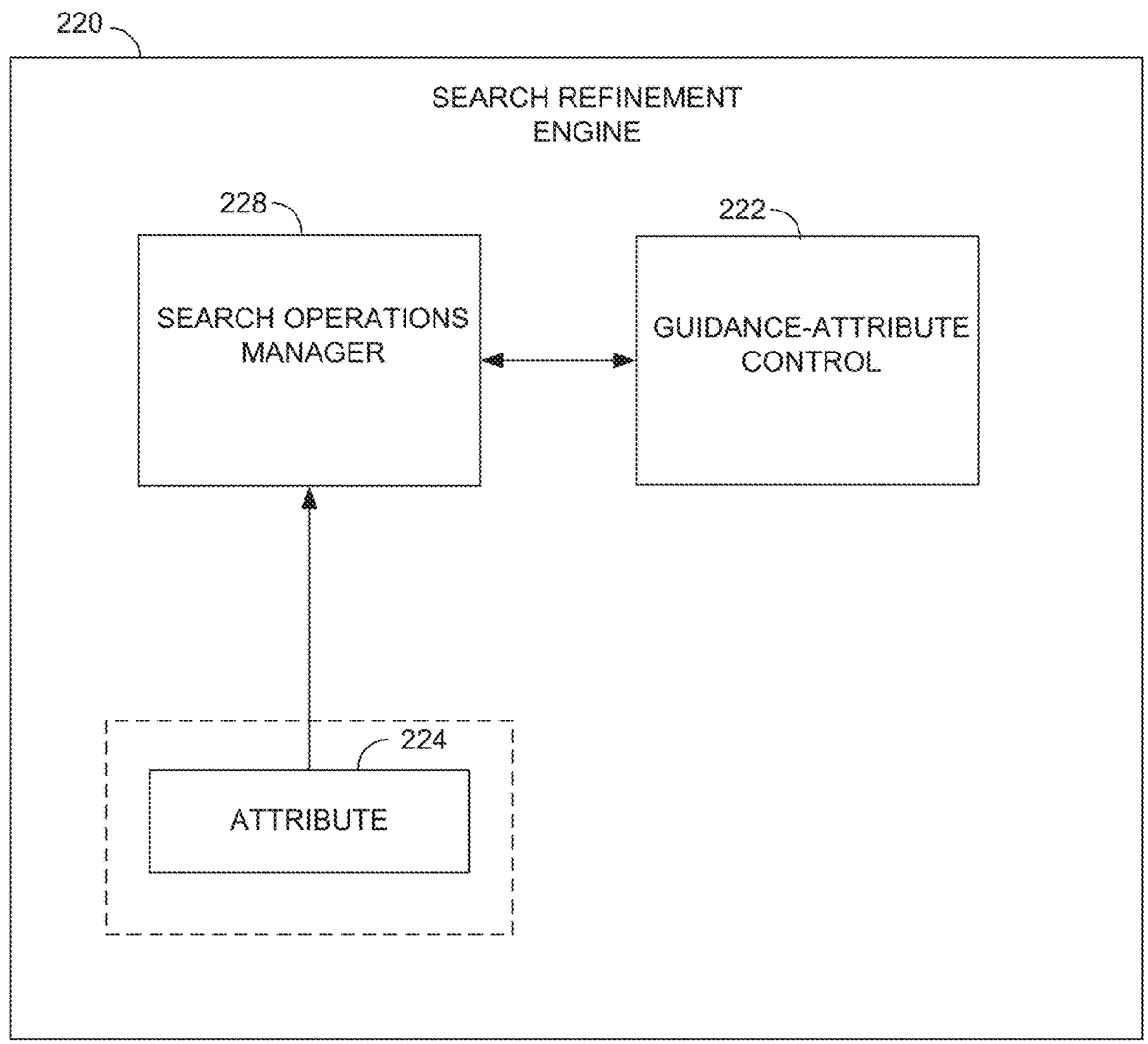

With reference to FIG. 2C, FIG. 2C illustrates search refinement engine 220 with components that support search refinement using selectively available embedded-value search operations. The selectively available embedded-value search operations may be based on the selected attribute (i.e., attribute 224). In particular, upon selecting a guidance attribute (i.e., attribute 224), the guidance attribute control 222 may be provided. The available embedded-value search operations may be determined using the search operations manager 228. In particular, the search operations manager 228 may analyze the selected guidance attribute (i.e., attribute 224) to determine what embedded-value search operations are optimally available. For example, if the guidance attribute "Color" is selected, selectable values may be presented using a color wheel with selectable color values and an auto-complete text-based search box that may be used to identify different color values and. As another example, if the guidance attribute "Brand" is selected, selectable values may be presented using selectable ranked values and an auto-complete text-based search box.

With reference to FIGS. 3A-3D, example implementations are provided of a search system having relevance-based search refinement. The example implementations may be performed using the search system described herein. In embodiments, the relevance-based search refinement may be provided using selectable guidance attributes. In further embodiments, the relevance-based search refinement may be provided using a guidance-attribute control (i.e., a user interface control object) having embedded selectable values of a guidance attribute.

Figure 3A:
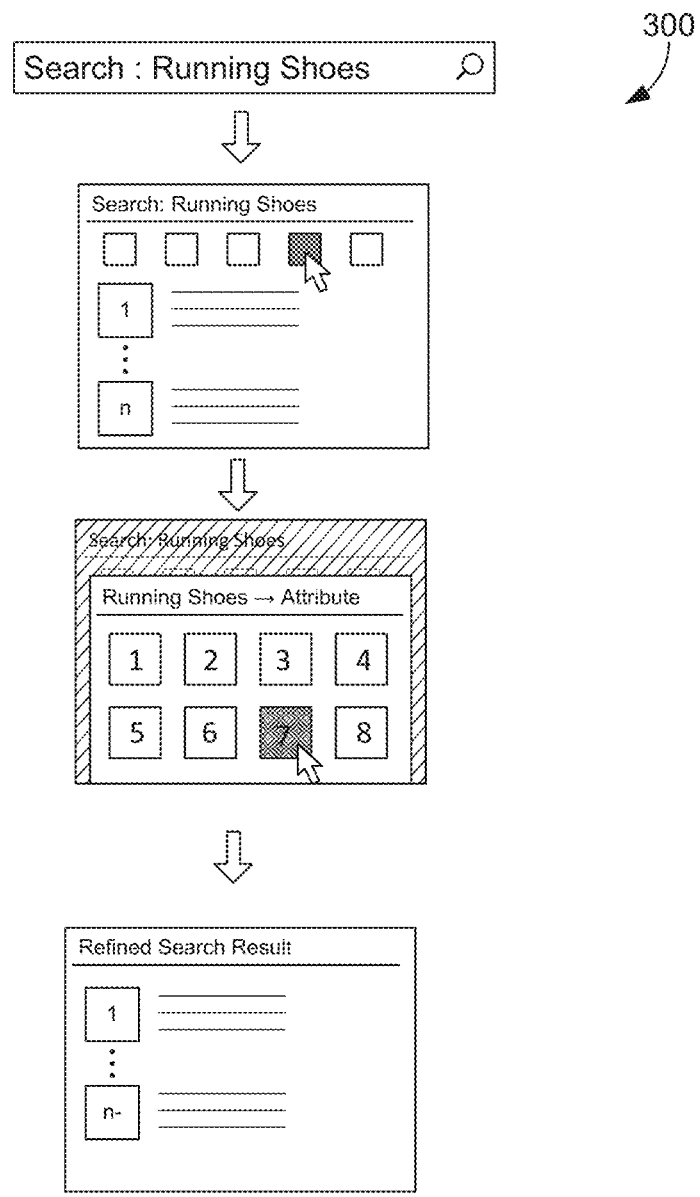
FIGS. 3A-3D are exemplary implementations of a search system with relevance-based search refinement, in which embodiments described herein may be employed.

Turning to FIG. 3A, an example implementation is provided of a search system having relevance-based search refinement. In particular, in FIG. 3A search system 300 may provide relevance-based search refinement using a selected attribute that triggers a guidance-attribute control that supports further relevance-based search refinement via integrated embedded-value search operation functionality using selectable values in the control. The search system 300 may receive a search query, "Running Shoes." In response to receiving a search query, the search system 300 may identify a set of running shoes in an item database. The identified set of items may be presented via a user interface (i.e., items 1 to n). Selectable guidance attributes may be presented along with the identified set of items. A guidance attribute may be selected.

Selection of the guidance attribute may result in the presentation of a guidance-attribute control. The guidance-attribute control may be presented as a partial overlay that comprises a user-interface element that indicates the embedded guidance-attribute control is active and the items responsive to the initial search query are inactive. The guidance-attribute control may have embedded selectable values of the selected guidance attribute. The embedded selectable values may be identified ranked set of characteristic (i.e., top-ranked values) of the selected guidance attribute (e.g., 1 to 8) based on historical user interactions with items responsive to the search query "Running Shoes." A value may be selected (i.e., 7), resulting in an embedded-value search operation to identify a subset of items from the identified set of items that have the selected value (e.g., the subset of items 1 to n-from the set of items 1 to n).

Figure 3B:
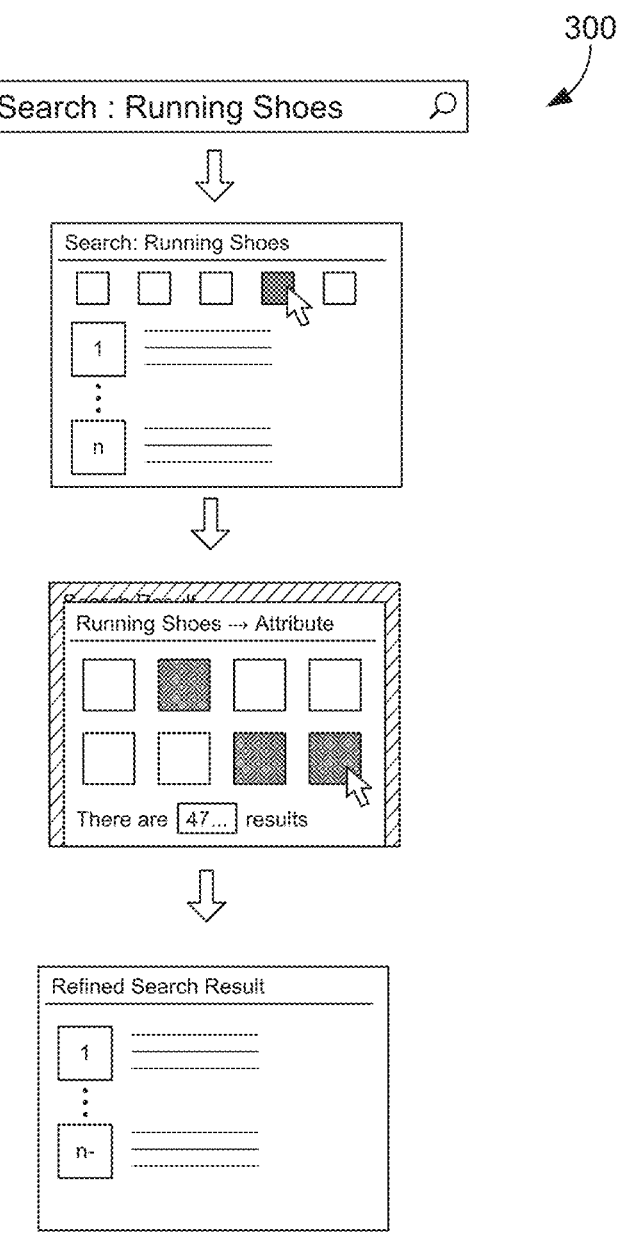

Turning to FIG. 3B, an example implementation is provided of a search system having relevance-based search refinement. In particular, in FIG. 3B search system 300 may provide relevance-based search refinement using a selected attribute that triggers a guidance-attribute control that supports further relevance-based search refinement via integrated embedded-value search operation functionality using selectable values in the control. The search system 300 may receive a search query, "Running Shoes." In response to receiving a search query, the search system 300 may identify a set of running shoes in an item database. The identified set of items may be presented via a user interface (i.e., items 1 to n). Selectable guidance attributes may be presented along with the identified set of items. A guidance attribute may be selected.

Selection of the guidance attribute may result in the presentation of a guidance-attribute control. The guidance-attribute control may have embedded selectable values of the selected guidance attribute. Multiple values may be selected, resulting in a dynamically updatable count of items that will be provided via the guidance-attribute control upon refinement using the selected value may be provided. Upon executing an embedded-value search operation using the selected multiple values, a subset of the identified set of items that have the selected values may be identified (e.g., the subset of items 1 to n-from the set of items 1 to n).

Figure 3C:
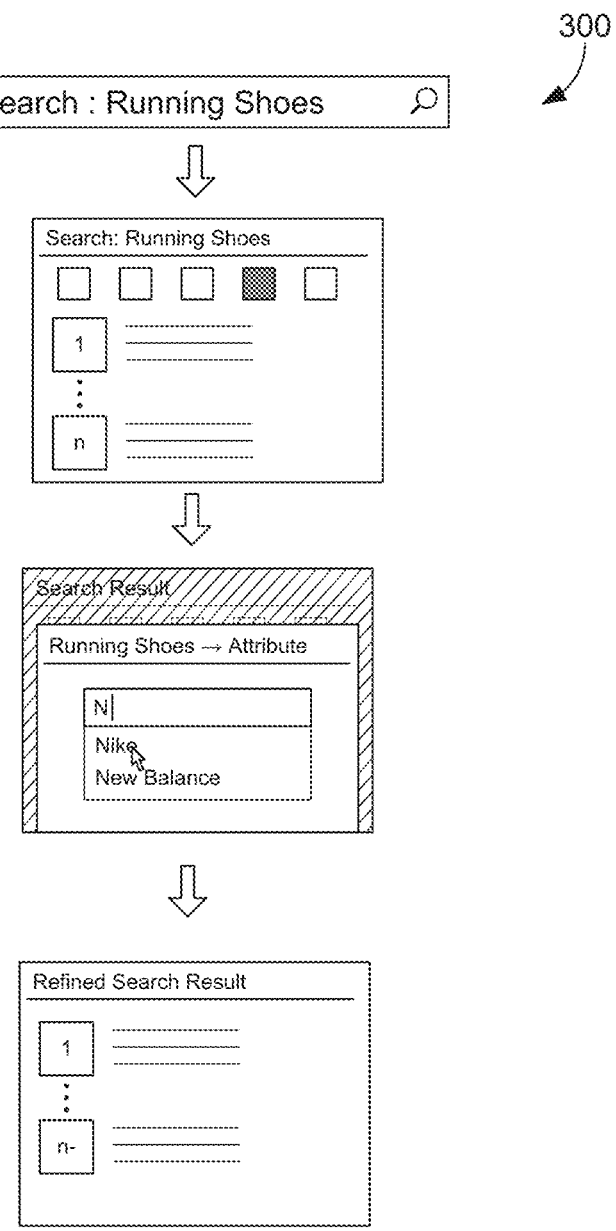

Turning to FIG. 3C, an example implementation is provided of a search system having relevance-based search refinement. In particular, in FIG. 3C search system 300 may provide relevance-based search refinement using a selected attribute that triggers a guidance-attribute control that supports further relevance-based search refinement via integrated embedded-value search operation functionality using selectable values in the control. The search system 300 may receive a search query, "Running Shoes." In response to receiving a search query, the search system 300 may identify a set of running shoes in an item database. The identified set of items may be presented via a user interface (i.e., items 1 to n). Selectable guidance attributes may be presented along with the identified set of items. A guidance attribute may be selected.

Selection of the guidance attribute may result in the presentation of a guidance-attribute control. The guidance-attribute control may have embedded selectable values of the selected guidance attribute. In particular, a value may be selected via the guidance-attribute control using text-based value searching. As depicted, as "N" is typed into the search bar, a list of "Nike" and "New Balance" may be presented as selectable values. From these values, a value (e.g., "Nike") may be selected from a list provided by typing text into a search bar. Text-based value searching may use the search bar limited to auto-complete of available search refinement terms (e.g., guidance attributes and/or values). Selecting one of the text-based value may result in an embedded-value search operation to identify a subset of the identified set of items that have the selected value (e.g., the subset of items 1 to n-from the set of items 1 to n).

Figure 3D:
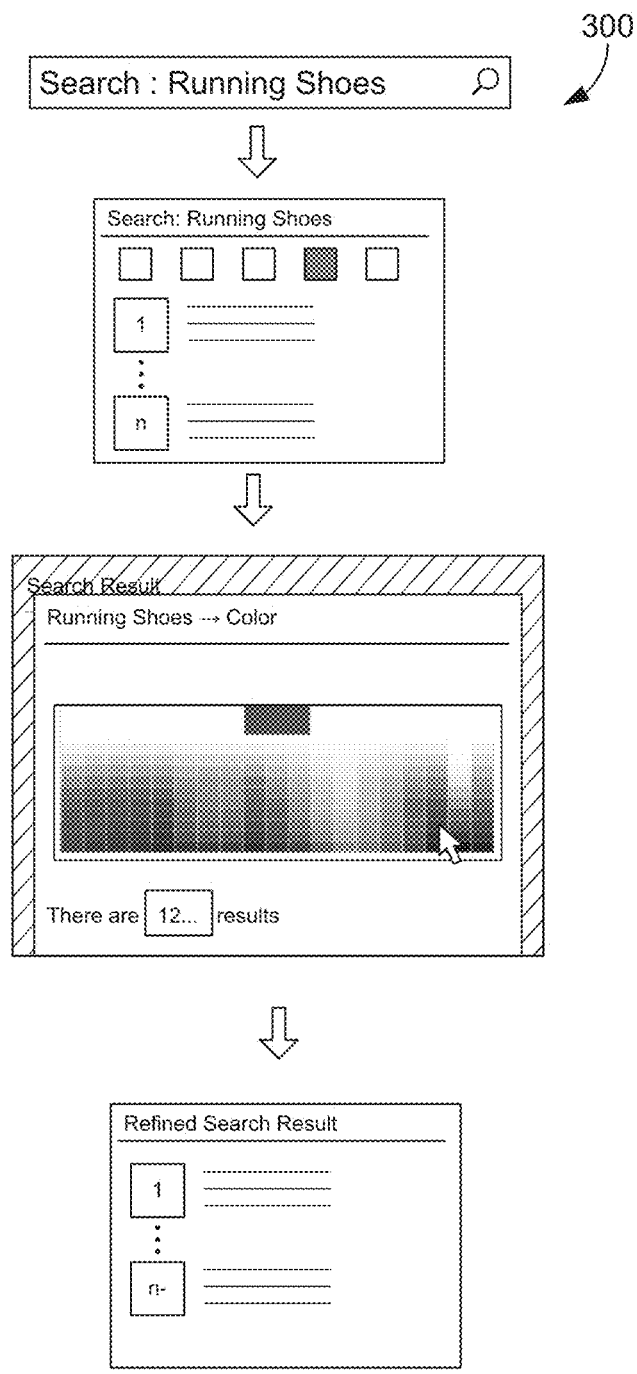

Turning to FIG. 3D, an example implementation is provided of a search system having relevance-based search refinement. In particular, in FIG. 3D search system 300 may provide relevance-based search refinement using a selected attribute that triggers a guidance-attribute control that supports further relevance-based search refinement via integrated embedded-value search operation functionality using selectable values in the control. The search system 300 may receive a search query, "Running Shoes." In response to receiving a search query, the search system 300 may identify a set of running shoes in an item database. The identified set of items may be presented via a user interface (i.e., items 1 to n). Selectable guidance attributes may be presented along with the identified set of items. A guidance attribute may be selected.

Selection of the guidance attribute may result in the presentation of a guidance-attribute control. The guidance-attribute control may have embedded selectable values of the selected guidance attribute. In particular, a value may be selected via the guidance-attribute control using color-based value searching. Color-based value searching may use a color gradient, as depicted. For instance, the color wheel may be used to select a specific shade or color (e.g., "Brown"). Using a color gradient may more exactly match colors of interest during refinement. Selecting a color value may result in an embedded-value search operation to identify a subset of the identified set of items that have the selected value (e.g., the subset of items 1 to n-from the set of items 1 to n).

Figure 4:
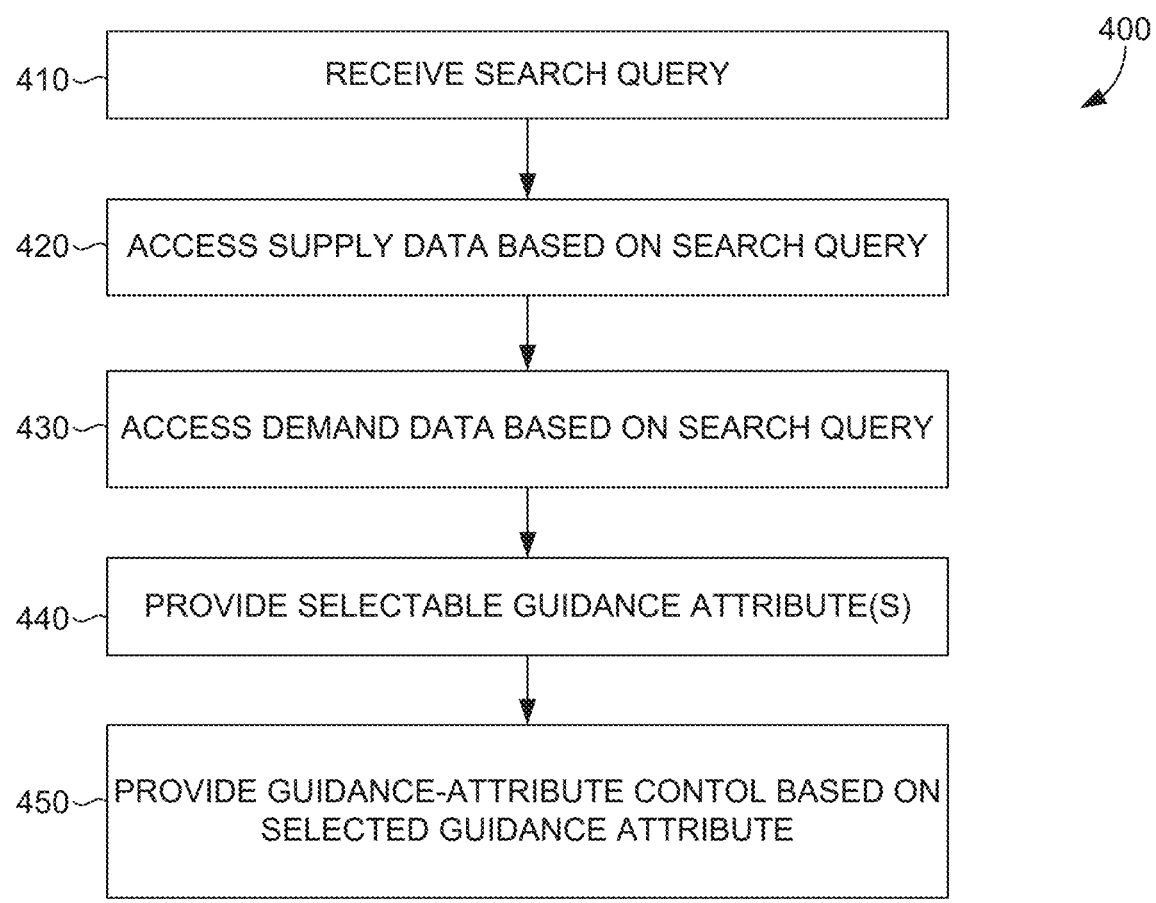
FIG. 4 is a flow diagram showing an exemplary method for implementing a search system with relevance-based search refinement, in accordance with embodiments described herein.
Figure 5:
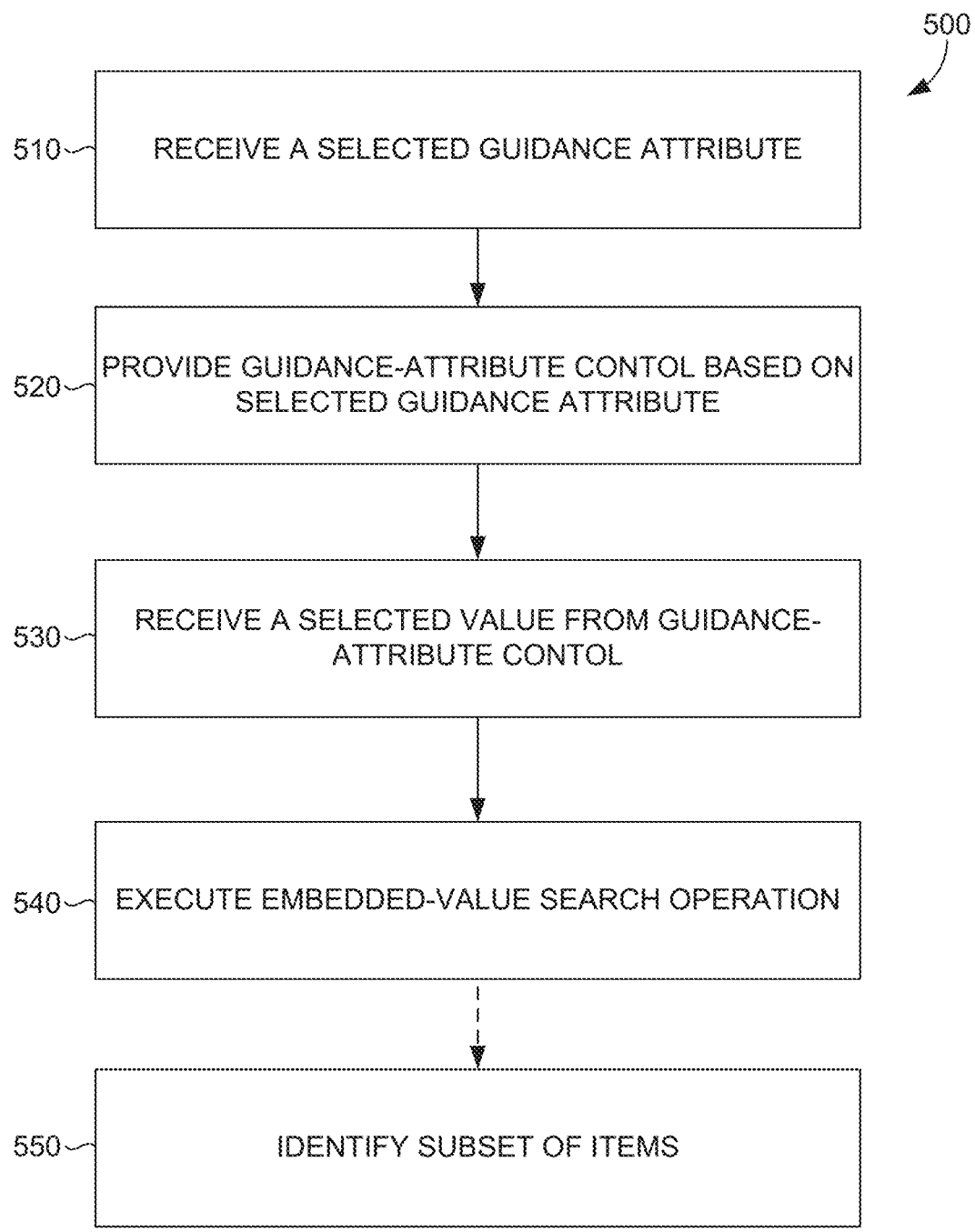
FIG. 5 is a flow diagram showing an exemplary method for implementing a search system with relevance-based search refinement, in accordance with embodiments described herein.
Figure 6:
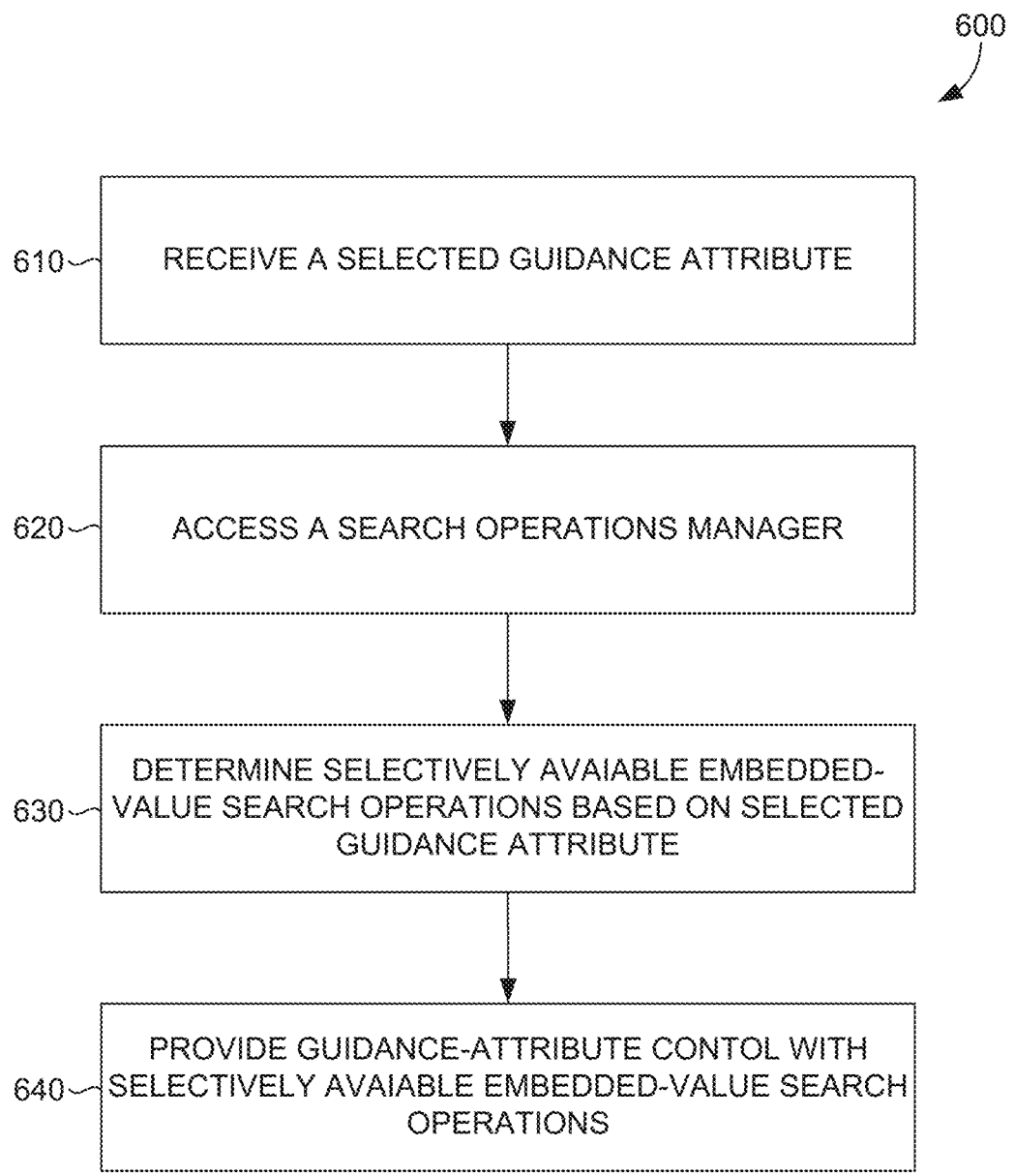
FIG. 6 is a flow diagram showing an exemplary method for implementing a search system with relevance-based search refinement, in accordance with embodiments described herein.

With reference to FIGS. 4, 5, and 6, flow diagrams are provided illustrating methods for implementing a search system for providing relevance-based search refinement. The methods may be performed using the search system described herein. In embodiments, one or more computer storage media having computer-executable instructions embodied thereon that, when executed, by one or more processors, may cause the one or more processors to perform the methods in the search system.

Turning to FIG. 4, a flow diagram is provided that illustrates a method 400 for implementing a search system for providing relevance-based search refinement using a guidance-attribute control having embedded selectable values of a guidance attribute. Initially at block 410, a search query is received. The search query may indicate an item or item type. For example, the search query may be "Running Shoes." At block 420, a supply data is accessed based on the search query. Such supply data may include items and associated item information of available items in an item database. At block 430, demand data is accessed based on the search query. Demand data may include information related to the popularity of item characteristics (e.g., guidance attributes and associated values). At block 440, selectable guidance attribute(s) are provided. Such selectable guidance attributes may be based in the demand data. In particular, the guidance attributes may be from a ranked set of characteristics of items based on historical user interactions with the items. At block 450, a guidance-attribute control is provided based on a selected guidance attribute. The guidance-attribute control provides embedded selectable values of the selected guidance attribute that initiate embedded-value search operations.

Turning to FIG. 5, a flow diagram is provided that illustrates a method 500 for implementing a search system for relevance-based search refinement. Initially at block 510, a selected guidance attribute is received. At block 520, a guidance-attribute control is provided based on the selected guidance attribute. At block 530, a selected values from the guidance-attribute control is received. At block 540, an embedded-value search operation is executed. In some embodiments, method 500 may progress to block 550 where a subset of items is identified.

Turning to FIG. 6, a flow diagram is provided that illustrates a method 600 for implementing a search system for providing relevance-based search refinement. Initially at block 610, a selected guidance attribute is received. At block 620, a search operations manager is accessed. At block 630, selectively available embedded-search operations based on the selected guidance attribute are determined. At block 640, a guidance-attribute control is provided with selectively available embedded-value search operations.

With reference to the search system 200, embodiments described herein support providing relevance-based search refinement for a search system. The search system components refer to integrated components that implement the search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for the novel functionality described herein.

With reference to FIG. 2A, FIG. 2A illustrates an exemplary search system 200 in which implementations of the present disclosure may be employed. In particular, FIG. 2A shows a high level architecture of search system 200 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components, managers, engines, or generators as hardware, software, firmware, a special-purpose device, or any combination thereof. A system may be integrated into a single device or it may be distributed over multiple devices. The various components, managers, engines, or generators of a system may be co-located or distributed. For example, although discussed for clarity as a singular component, operations discussed may be performed in a distributed manner. The system may be formed from other systems and components thereof. It should be understood that this and other arrangements described herein are set forth only as examples.

Having identified various component of the search system 200, it is noted that any number of components may be employed to achieve the desired functionality within the scope of the present disclosure. Although the various components of FIG. 2A are shown with lines for the sake of clarity, in reality, delineating various components is not so clear, and metaphorically, the lines may more accurately be grey or fuzzy. Further, although some components of FIG. 2A are depicted as single components, the depictions are exemplary in nature and in number and are not to be construed as limiting for all implementations of the present disclosure. The search system 200 functionality may be further described based on the functionality and features of the above-listed components.

Other arrangements and elements (e.g., machines, interfaces, functions, orders, and groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 7:
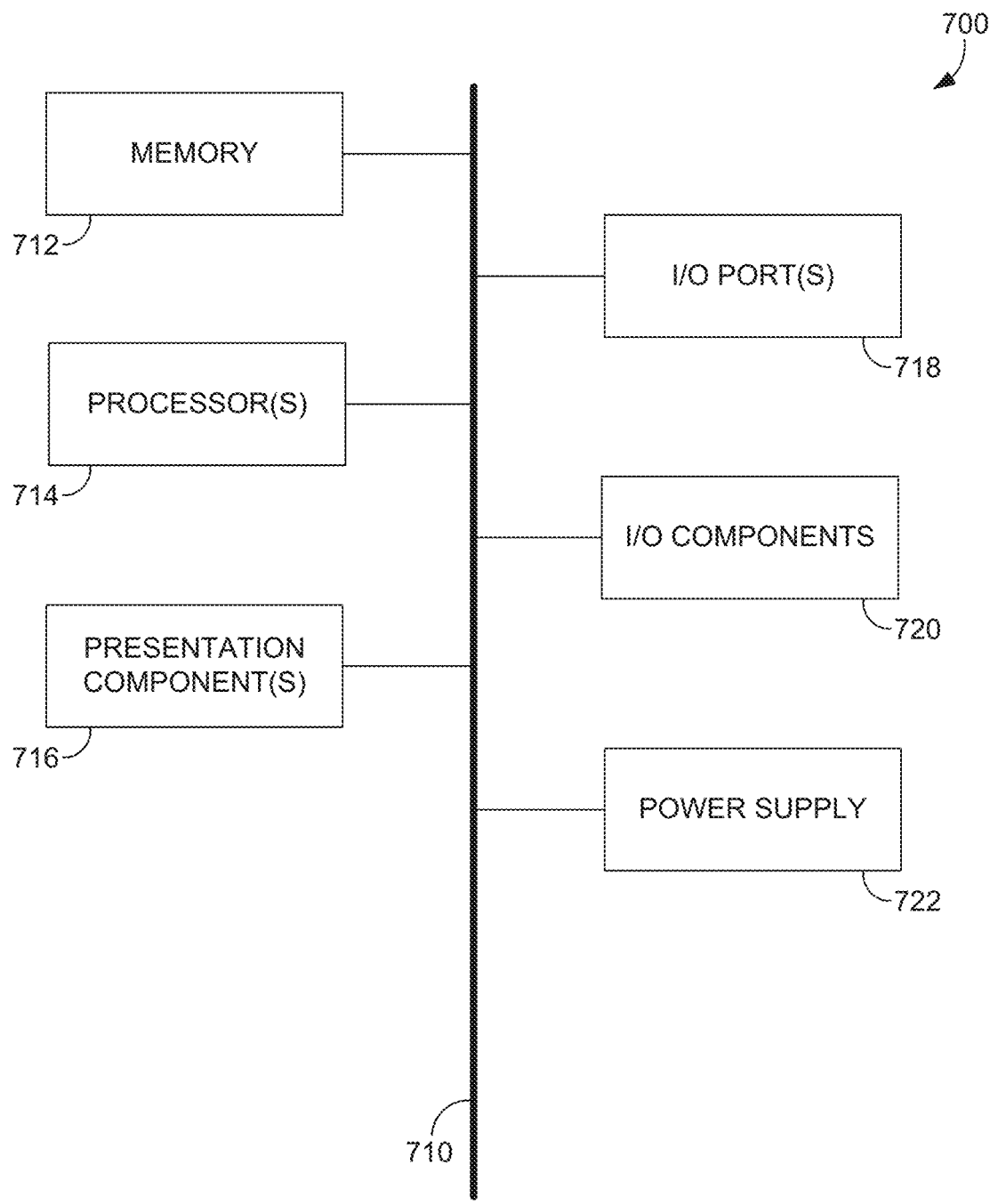
FIG. 7 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that may be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media may be any available media that may be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing" or "instructing" where the corresponding action may be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components may be configured for performing novel aspects of embodiments, where the term "configured for" may refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for providing embedded-item-attribute search operations, the method comprising:

causing display of a plurality of items that are responsive to an initial search query;

causing display of a plurality of guidance attributes associated with refining the plurality of items without causing display of any of one or more values of the plurality of guidance attributes, the plurality of guidance attributes are an identified ranked set of characteristics of the plurality of items based on historical user interactions with the plurality of items;

receiving a selection of a guidance attribute from the plurality of guidance attributes;

based on receiving the selection of the guidance attribute, causing display of a guidance-attribute control corresponding to the guidance attribute, wherein the guidance-attribute control is embedded with the one or more values of the guidance attribute that were previously not displayed, wherein selection of the guidance attribute triggers the guidance-attribute control as a partial overlay comprising a user-interface element that indicates guidance-attribute control is active, wherein the one or more values are selectable to initiate one or more embedded-value search operations, wherein the one or more embedded-value search operations are selectively available in the guidance-attribute control based on the selected guidance attribute;

receiving a selection of at least one value of the one or more values from the guidance-attribute control; and based on receiving the selection of the at least one value, causing execution of an embedded-value search operation of the one or more embedded-value search operations, wherein the embedded-value search operation performs one of the following:

identifying a subset of the plurality of items using the at least one value; and providing a dynamically updatable count of the plurality of items using the at least one value.

2. The method of claim 1, wherein, the one or more values are ranked based on the historical user interactions with the plurality of items.

3. The method of claim 1, wherein the embedded-value search operation uses an auto-complete text-based search box associated with searching the one or more values of the selected guidance attribute.

4. The method of claim 1, wherein the dynamically updatable count of the plurality of items indicates a number of search results that have the at least one value, wherein the dynamically updatable count is configured for counting a second set of search results that will be provided upon refinement of a first set of search results based on a selected value.

5. The method of claim 1, wherein the selection of the guidance attribute that triggers the guidance-attribute control as the partial overlay comprising a user-interface element that indicates guidance-attribute control is active further causes the plurality of items responsive to the initial search query to become inactive.

6. The method of claim 1, wherein the embedded-value search operation uses a color embedded-value search operation when the selected attribute is color.

7. One or more computer storage media having computer-executable instructions embodied thereon that, when executed, by one or more processors, cause the one or more processors to perform a method for providing embedded-item-attribute search operations, the method comprising:

causing display of a plurality of items that are responsive to an initial search query;

causing display of a plurality of guidance attributes associated with refining a plurality of items without causing display of any of one or more values of the plurality of guidance attributes;

receiving a selection of a guidance attribute from the plurality of guidance attributes;

based on receiving the selection of the guidance attribute, causing display of a guidance-attribute control corresponding to the guidance attribute, wherein the guidance-attribute control is embedded with the one or more values of the guidance attribute that were previously not displayed, wherein selection of the guidance attribute triggers the guidance-attribute control as a partial overlay comprising a user-interface element that indicates guidance-attribute control is active wherein the one or more values are selectable to initiate one or more embedded-value search operations wherein the one or more embedded-value search operations are selectively available in the guidance-attribute control based on the selected guidance attribute;

receiving a selection of at least one value of the one or more values from the guidance-attribute control; and based on receiving the selection of the at least one value, causing execution of an embedded-value search operation of the one or more embedded-value search operations.

8. The media of claim 7, the method further comprising: identifying a subset of the plurality of items using the at least one value.

9. The media of claim 7, wherein the plurality of guidance attributes are an identified ranked set of characteristics of the plurality of items based on historical user interactions with the plurality of items.

10. The media of claim 7, wherein the one or more values are ranked based on the historical user interactions with the plurality of items.

11. The media of claim 7, wherein the embedded-value search operation uses an auto-complete text-based search box associated with searching the one or more values of the selected guidance attribute.

12. The media of claim 7, wherein the embedded-value search operation provides a dynamically updatable count of the plurality of items that indicates a number of search results for the at least one value, wherein the dynamically updatable count is configured for counting a second set of search results that will be provided upon refinement of a first set of search results based on a selected value.

13. The media of claim 7, wherein the embedded-value search operation uses a color embedded-value search operation when the selected attribute is color.

14. The media of claim 7, wherein the selection of the guidance attribute that triggers the guidance-attribute control as the partial overlay comprising a user-interface element that indicates guidance-attribute control is active further causes the plurality of items responsive to the initial search query to become inactive.

15. A search system for providing embedded-item-attribute search operations, the system comprising:

one or more processors; and one or more computer storage media storing computer-useable instructions that, when used by the one or more processors, cause the one or more processors to execute:

a search refinement engine to:

cause display of a plurality of items that are responsive to an initial search query;

cause display of a plurality of guidance attributes associated with refining a plurality of items without causing display of any of one or more values of the plurality of guidance attributes;

receive a selection of a guidance attribute from the plurality of guidance attributes;

based on receiving the selection of the guidance attribute, cause display of a guidance-attribute control corresponding to the guidance attribute, wherein the guidance-attribute control is embedded with one or more values of the guidance attribute that were previously not displayed, wherein selection of the guidance attribute triggers the guidance-attribute control as a partial overlay comprising a user-interface element that indicates guidance-attribute control is active, wherein the one or more values are selectable to initiate one or more embedded-value search operations wherein the one or more embedded-value search operations are selectively available in the guidance-attribute control based on the selected guidance attribute;

receive a selection of at least one value of the one or more values from the guidance-attribute control;

based on receiving the selection of the at least one value, cause execution of an embedded-value search operation of the one or more embedded-value search operations.

16. The system of claim 15, wherein the instructions further cause the one or more processors to execute:
the search refinement engine to:
identify a subset of the plurality of items using the at least one value.

17. The system of claim 15, wherein the plurality of guidance attributes are an identified ranked set of characteristics of the plurality of items based on historical user interactions with plurality of items.

18. The system of claim 15, wherein the one or more values are ranked based on the historical user interactions with the plurality of items.

19. The system of claim 15, wherein the selection of the guidance attribute that triggers the guidance-attribute control as the partial overlay comprising a user-interface element that indicates guidance-attribute control is active further causes the plurality of items responsive to the initial search query to become inactive.

20. The system of claim 15, wherein the one or more embedded-value search operations comprises each of the following:
an auto-complete text-based search box associated with searching the one or more values of the selected guidance attribute,
a dynamically updatable count of the plurality of items that indicates a number of search results for the at least one value, wherein the dynamically updatable count is configured for counting a second set of search results that will be provided upon refinement of a first set of search results based on a selected value; and
a color embedded-value search operation when the selected attribute is color.

* * * * *